May 11, 1937.　　　G. F. YAGER ET AL　　　2,080,158
METALWORKING MACHINE
Filed April 29, 1935　　　5 Sheets-Sheet 4

INVENTORS
GEORGE F. YAGER
OLIVER J. HEATH
BY
ATTORNEYS

May 11, 1937.  G. F. YAGER ET AL  2,080,158
METALWORKING MACHINE
Filed April 29, 1935  5 Sheets-Sheet 5

INVENTORS
GEORGE F. YAGER
OLIVER J. HEATH
BY
ATTORNEYS

Patented May 11, 1937

2,080,158

UNITED STATES PATENT OFFICE 2,080,158

METALWORKING MACHINE

George F. Yager and Oliver J. Heath, Toledo, Ohio, assignors to The Bunting Brass and Bronze Company, Toledo, Ohio, a corporation of Ohio Application April 29, 1935, Serial No. 18,953

10 Claims. (Cl. 29—38)

This invention relates generally to metal working machines and refers more particularly to improvements in apparatus of the type embodied in our copending application, Serial No. 639,354, filed October 24, 1932 for grooving bushings or like members.

The present invention concerns itself more specifically with improved mechanism for actuating the grooving spindles to form grooves in the bushing blanks of practically any desired configuration, and has as one of its principal objects to provide the actuating mechanism with means for reciprocating the spindles, and with means operable in dependence upon reciprocation of the spindles to simultaneously rotate the latter.

Another advantageous feature of this invention consists in the provision of a grooving spindle having a portion formed with cam grooves therein inclined with respect to the axis of the spindle and cooperating with a relatively fixed follower in such a manner that reciprocation of the spindle imparts a rotative movement to the latter. It will be observed that with the above construction the configuration of the oil groove formed in the bushing blank by the spindle depends upon the angle of inclination of the cam grooves with respect to the axis of rotation of the spindle, and a further feature of this invention consists in the provision of a spindle wherein the portion having the cam grooves therein is readily removable from the remaining portion of the spindle, so as to permit the same to be interchanged with portions having cam grooves of different angular relationship with respect to the axis of the spindle.

A further object of this invention resides in the provision of a metal working machine of the type having two or more grooving spindles of the character previously set forth, adapted to successively groove a bushing blank and capable of being operated in such a manner as to cooperate with each other in forming compound grooves in each bushing of practically any desired configuration.

The foregoing, as well as other objects, will be made more apparent as this description proceeds, especially when considered in connection with the accompanying drawings, wherein.

Figure 2:
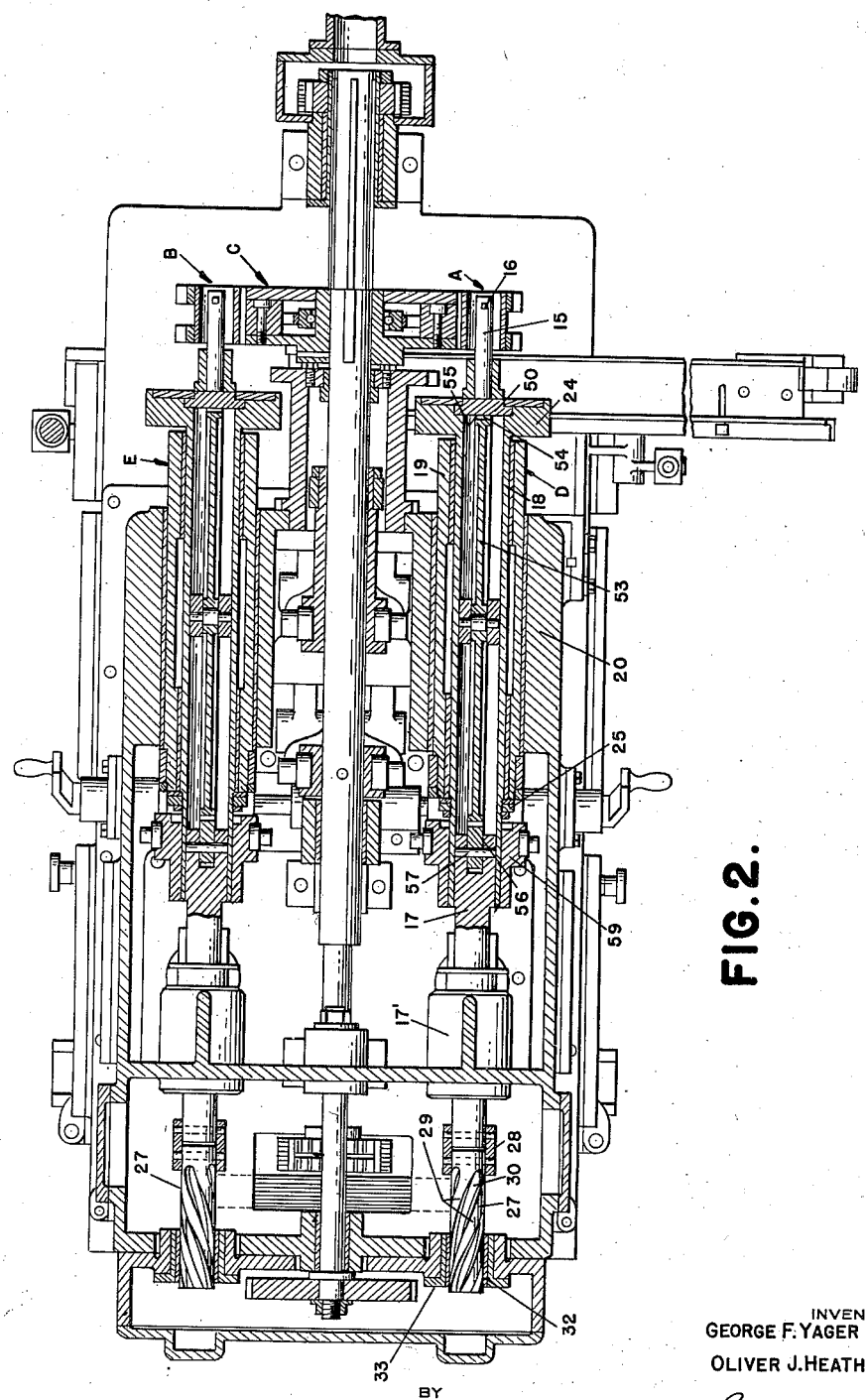
Figure 2 is a horizontal sectional view through a machine equipped with two grooving tools actuated in accordance with this invention.

For the purpose of illustrating the two embodiments of the actuating mechanism for the grooving tools, we have selected a metal working machine having two work performing stations A and B, and having a work holder or turret C for successively positioning the bushing blanks in registration with each of the stations. As shown, particularly in Figure 2, grooving devices D and E are respectively supported at the stations A and B for simultaneous operation upon the bushing blanks supported by the turret in registration with these stations. As will be more fully hereinafter set forth, the two grooving tool assemblies are simultaneously reciprocated and rotated with respect to the bushings to groove the inner surfaces of the latter and although the path of travel of each of the grooving tools need not necessarily be the same, nevertheless, they are carefully predetermined so that both of the tools will cooperate to form an oil groove in each bushing of the desired configuration. The turret C is indexed in timed relation to the reciprocation of the two grooving tool assemblies, so as to provide for successively positioning each bushing blank in registration with the assemblies.

In the present instance, both of the grooving tool assemblies are identical in construction with the exception of the direction of inclination of the cam grooves controlling the path of travel of the grooving tool, and accordingly, a detailed description of one of the grooving assemblies will suffice for an understanding of this invention.

The grooving assembly at station A will now be described in detail, and it will be noted from Figure 1 that this assembly comprises a tool holder 15 in the form of a spindle adapted to extend into the bushing blanks as the latter assume positions in registration therewith and having a grooving tool 16 secured thereto for forming the desired groove in the bushing. The grooving tool 16 is moved relative to the bushing blank throughout a path of travel determined by the spiraled cam groove to be presently described, and is also moved radially outwardly with respect to the bushing to actually cut an oil groove in the inner surface of the bushing corresponding in configuration to the path of travel of the tool. Referring now to the particular construction of the grooving tool assembly for affecting the foregoing movements of the tool 16, it will be noted from Figure 1, that the spindle 15 is carried by a shaft 17 having the rear end journaled in a bearing 17', fixed to the machine frame and having a tubular forward end portion 18 journaled in a sleeve 19 slidably, but non-rotatably, mounted in a bearing 20 fixedly secured to the machine frame. In the present instance, the sleeve 19 is prevented from rotation by means of a key 21 secured to the bearing 20 and having a portion 22 projecting into a slot 23 extending longitudinally of the sleeve 19. The forward end of the sleeve 19 engages the rear side of an enlarged head 24 on the tubular portion 18 of the shaft 17 and the rear end of the sleeve 19 engages a suitable jam nut 25 threadedly secured upon the tubular portion 18 of the shaft. The foregoing construction is such that reciprocation of the sleeve 19 will effect a corresponding reciprocation of the shaft 17 and the spindle 15 carrying the grooving tool 16.

Figure 4:
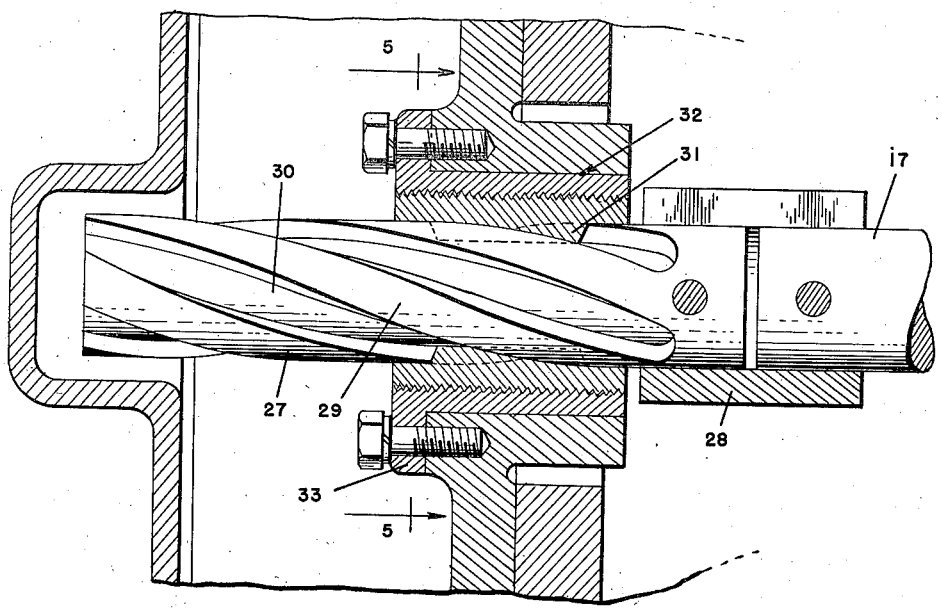
Figure 4 is an enlarged longitudinal sectional view of a portion of the machine featuring the grooving tool actuating means.
Figure 5:
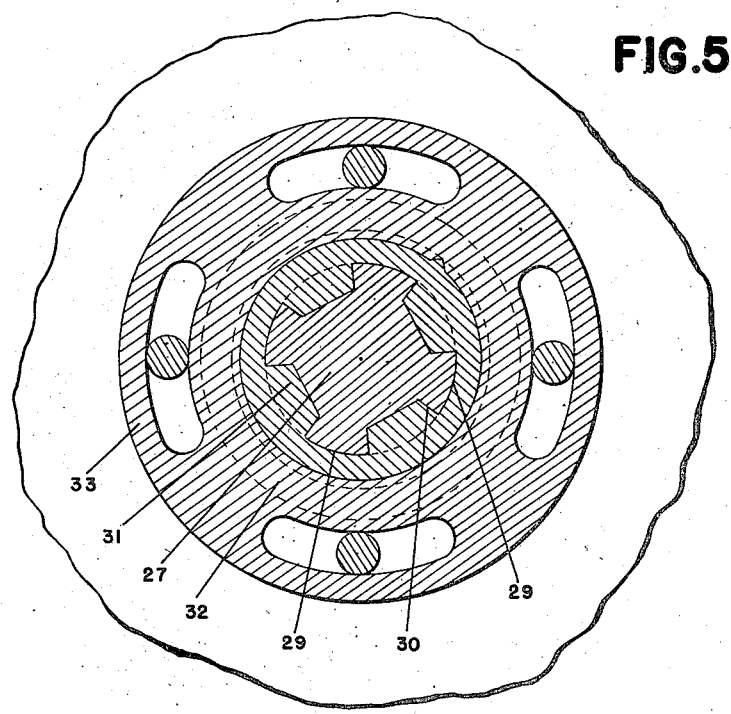
Figure 5 is a cross sectional view taken substantially on the plane indicated by the line 5—5 of Figure 4.

Referring now to Figure 4, it will be noted that the rear end of the shaft 17 projects rearwardly beyond the bearing 17' and is readily detachably secured to a follower 27 through the medium of a coupling 28. The coupling 28 is of the split tubular type and functions to secure the follower in axial alignment with the shaft 17. The follower 27 is formed with spiraled splines 29 having a right-hand lead and forming spiraled cam grooves 30 for engaging the corresponding spiraled lands 31 formed in the inner surface of follower nut 32. The follower nut 32 is fixed against rotation to the machine frame so that reciprocation of the shaft 17 by the sleeve 19 will impart a rotative movement to the shaft 17 and also to the tool 16 through the spindle 15. The extent of rotative movement of the tool 16 during reciprocation thereof, or in other words, the configuration of the resulting groove formed by the tool depends upon the particular inclination of the spiral grooves 30 with respect to the axis of rotation of the shaft 17. Consequently, the follower 27 is capable of being readily removed from the rear end of the shaft 17 to permit the same to be quickly interchanged with followers having different types of spiral grooves, and since the follower nut 32 must correspond to the particular type of follower employed, this nut is also capable of being readily removed. In this connection, it will be noted from Figure 4, that the nut is sleeved in the machine frame and is provided with a radial flange 33 at the rear end bolted to the rear side of the frame. If desired, the bolt openings through the radial flange may be elongated circumferentially to provide for angularly adjusting the spindle 15 to position the tool 16 relative to the work or bushing being grooved. Attention may also be called to the fact at this time that the nut is lined with babbitt, and that the lands 31 are formed in the babbitt lining. This arrangement renders it possible to inexpensively manufacture the follower nut, and at the same time insures an accurate fit of the lands 31 with the spiral grooves 30 in the follower 27.

Figure 1:
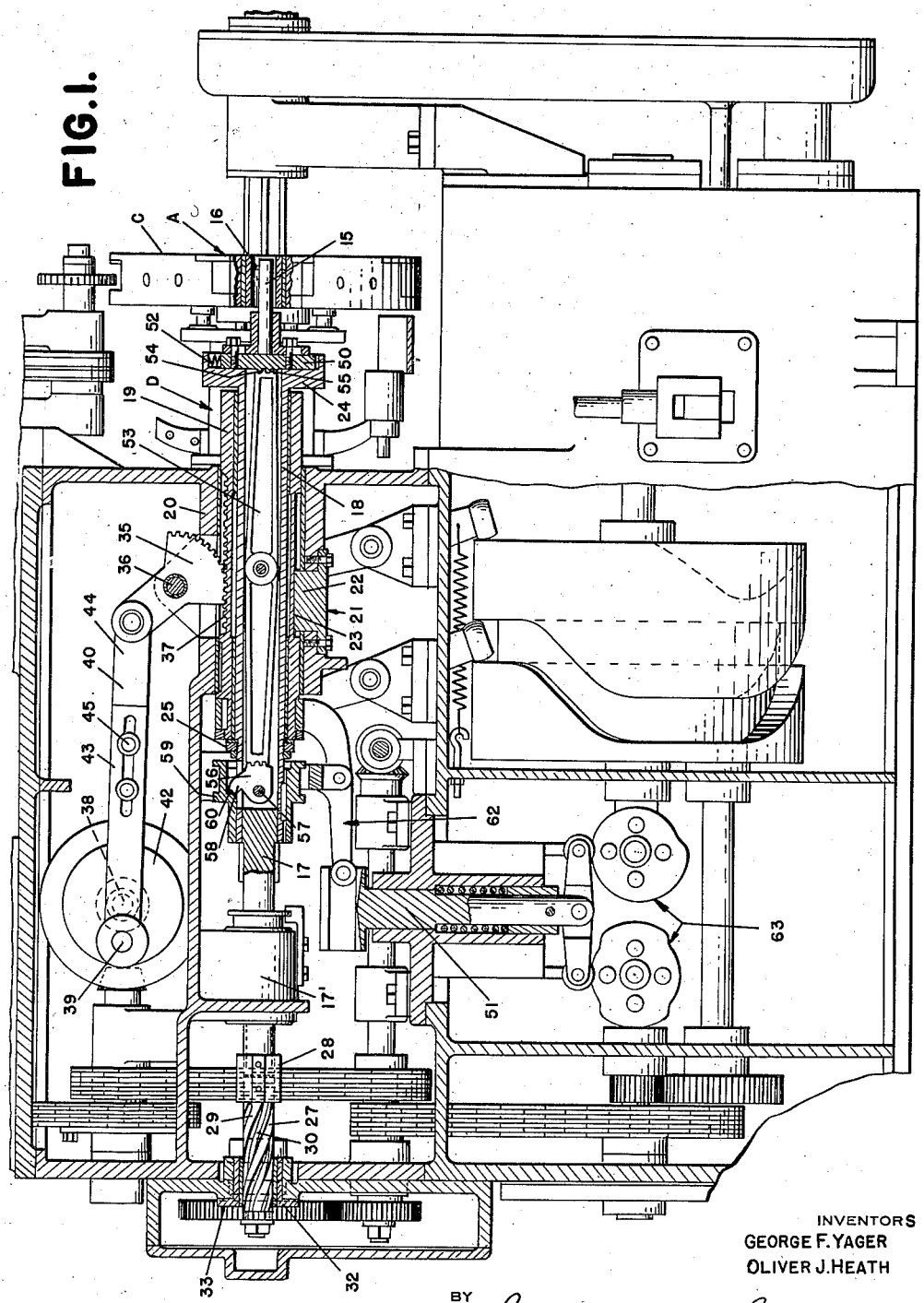
Figure 1 is a vertical sectional view through a portion of a metal working machine illustrating actuating means for the grooving tool constructed in accordance with this invention.
Figure 3:
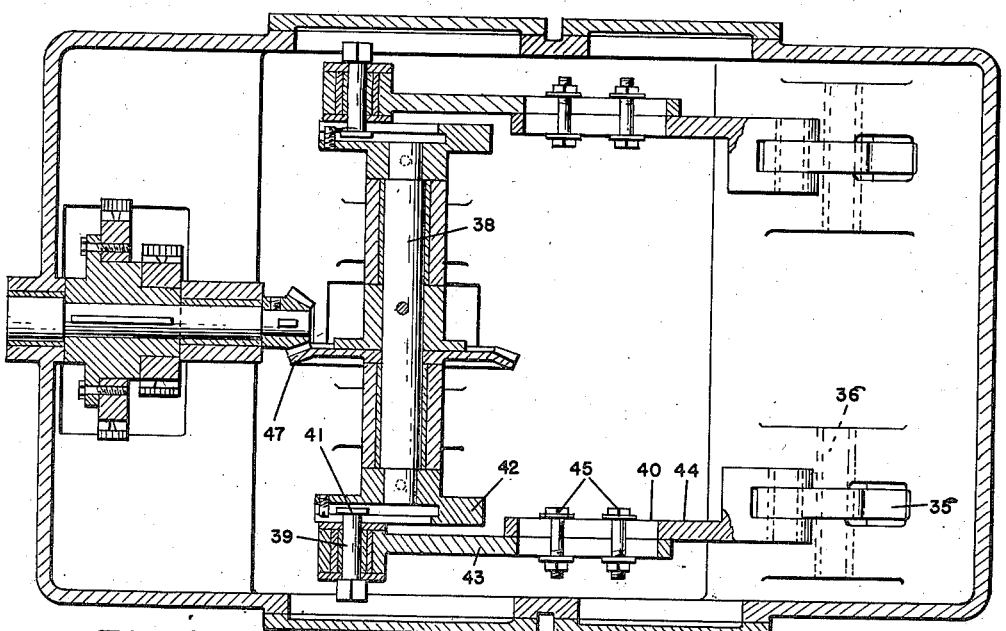
Figure 3 is a horizontal sectional view through the mechanism employed for reciprocating the grooving tools shown in Figure 2.

In order to impart a reciprocatory movement to the shaft 17 through the medium of the sleeve 19, the construction shown in Figures 1 and 3 is provided. In detail, this construction comprises a gear segment 35 mounted for oscillation about an axis 36 extending transversely of the axis of the sleeve 19 and having the teeth thereof fashioned to mesh with corresponding rack teeth 37 spaced longitudinally of the sleeve 19. The gear segment 35 is oscillated about the axis 36 by means of a crank shaft 38 having a crank pin 39 at one end thereof operatively connected to the gear segment through the medium of a connecting rod 40. The crank pin 39 has an adjustable connection 41 with the cheek 42 of the crank shaft, so as to permit the throw of the crank pin to be varied from zero to a predetermined maximum. Moreover, the connecting rod 40 is formed of two parts 43 and 44 having the adjacent ends thereof adjustably secured together as at 45, so as to provide for accurately locating the reciprocatory stroke of the tool 16 relative to the bushing blank to be grooved. The foregoing construction is duplicated upon the opposite end of the crank shaft 38 and is connected to the other grooving tool assembly for reciprocating the cutting tool associated therewith. The crank shaft 38 is rotated to actuate both of the grooving tool assemblies at the two stations simultaneously, by means of suitable gearing 47 driven from a source of power (not shown).

Figures 6, 10:
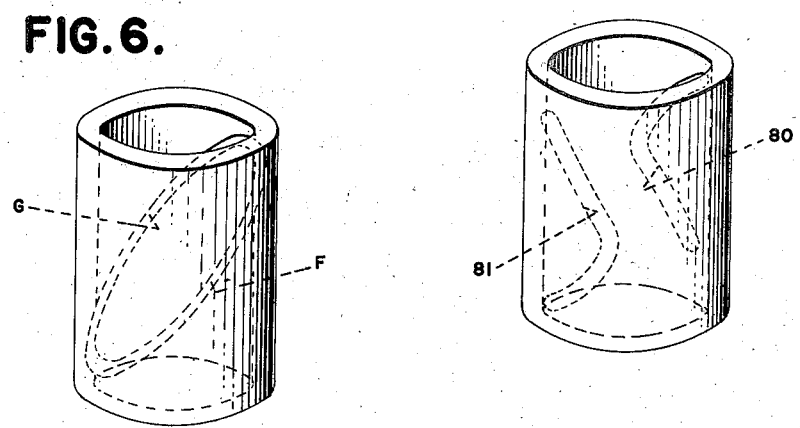
Figure 6 is an elevational view of a bushing having oil grooves therein formed in accordance with this invention.
Figure 10 is a view similar to Figure 6 showing oil grooves of different configuration.
Figure 7:
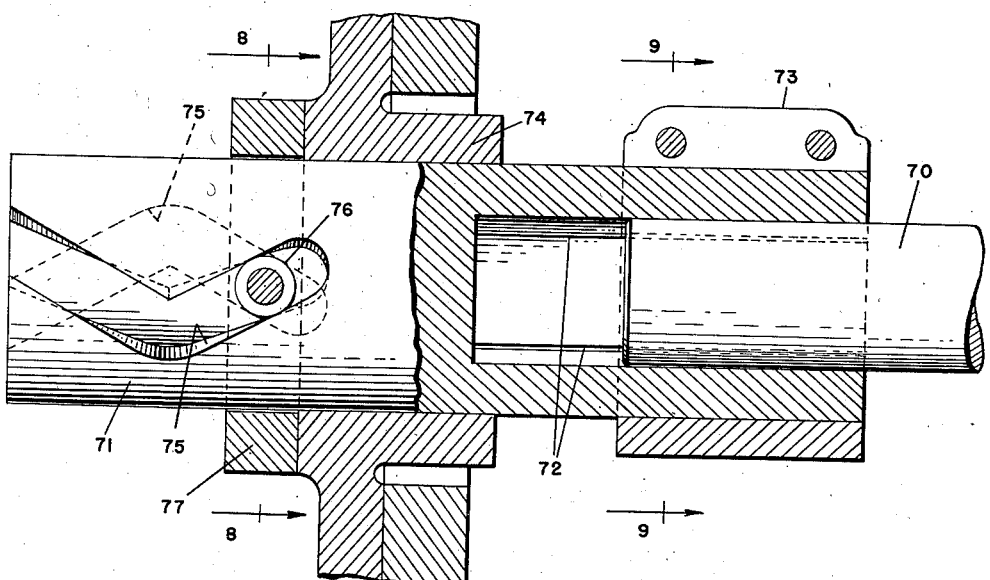
Figure 7 is a view similar to Figure 4 showing a slightly modified form of actuating mechanism for the grooving tools.
Figure 8:
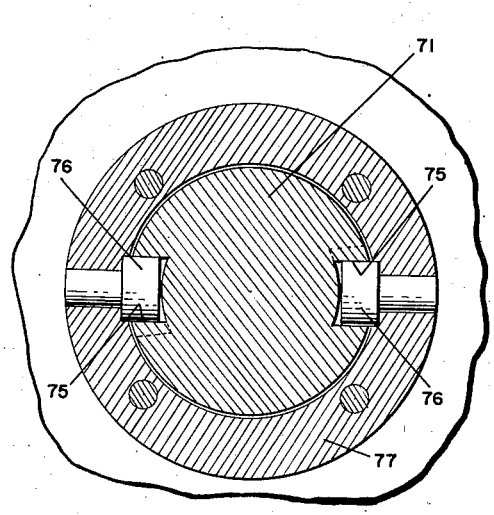
Figure 8 is a sectional view taken on the line 8—8 of Figure 7.
Figure 9:
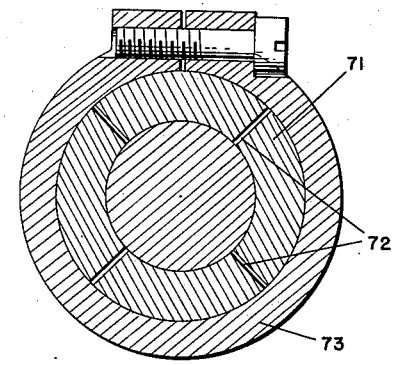
Figure 9 is a sectional view taken on the line 9—9 of Figure 7.

From the foregoing, it will be apparent that reciprocation of the two grooving tools by the crank shaft 38 will also impart a rotative movement to the tools depending upon the angle of inclination of the spiraled cam grooves 30 in the shaft 17 of each assembly. As previously stated, the spiraled cam grooves 30 in the shaft 17 in the grooving assembly at station A have a right-hand lead, and in the present instance, the follower 27 of the grooving assembly at station B is provided with a left-hand lead, so that both of the grooving assemblies will cooperate to form two grooves in each bushing during one complete cycle of operation of the turret C. With the particular construction shown in the embodiment of the invention featured in Figures 1 to 6 inclusive, the two grooving tool assemblies cooperate in forming oil grooves in the bushing of the approximate configuration illustrated in Figure 6, wherein the reference character F illustrates the groove formed by the assembly at station A and the reference character G designates the groove formed by the assembly at station B. It will, of course, be understood that any one of a number of different types of grooves may be formed in the bushings by merely interchanging the followers 27 and follower nuts 32 with corresponding parts having interengaging cam grooves and lands inclined at a different angle to the axis of the shaft 17.

In the previous description, reference has been made to the fact that the tool 16 is capable of a radial movement so as to provide for moving the same into and out of engagement with the bushing. In the interest of simplicity, we have shown the means for accomplishing the foregoing as being identical to the means employed in our copending application, Serial No. 639,354, filed October 24, 1932. Briefly described, the tool holding spindle 15 is secured to a plate 50 mounted in the enlargement 24 at the forward end of the shaft 17 for radial sliding movement relative to the axis of this shaft. The plate 50 is positively moved radially outwardly to feed the tool 16 toward the bushing by means of a cam actuated plunger 51 and is yieldably moved in the opposite direction to withdraw the tool from the work, by means of a spring 52. The operative connection between the cam actuated plunger 51 and plate 50 to effect movement of the tool 16 radially outwardly is perhaps best shown in Figure 1, and comprises a rock arm 53 located within the tubular portion 18 of the shaft 17 and pivotally mounted intermediate its ends to the shaft for rocking movement about an axis extending at right angles to the axis of rotation of the shaft. The forward end of the rock arm is provided with teeth 54 for engaging corresponding teeth 55 on the rear face of the plate, while the rear end of the rock arm is adapted to mesh with a gear segment 56 mounted for rocking movement about a pin 57 having its axis extending parallel to the axis of rocking movement of the arm. The gear segment 56 is provided with an extension 58 extending through an elongated slot in the tubular portion 18 of the shaft 17 for engagement with a reciprocable collar 59. As shown in Figure 1, the collar is provided with an internal shoulder 60 engageable with the extension 58, so that movement of the collar 59 forwardly effects a rocking movement of the arm 53 through the gear segment 56 in a direction to move the plate 50 and tool 16 radially outwardly. The collar 59 is connected to the plunger 51 by means of suitable linkage 62 and actuation of the plunger to effect the forward movement of the collar is secured by the cams 63. The cams 63 operate in timed relation to the reciprocation of the grooving tool 16 to periodically feed the same radially outwardly into cutting engagement with the bushing and to permit withdrawal of the tool by the spring 52. The manner in which this is accomplished forms no part of the present invention, and accordingly, this description will not be complicated by a definition of the same.

In the embodiment of the invention shown in Figures 7 to 10 inclusive, we have illustrated a modified form of follower construction. As shown particularly in Figure 7, the shaft 70 is identical in construction to the shaft 17, and the outer end thereof is received by the inner end of the follower 71. In this connection, it will be noted that the inner end portion of the follower 71 adapted to receive the splined portion of the shaft 70 is split as at 72 at circumferentially spaced points, and is clamped to the outer end of the shaft 70, by means of a split collar 73. This arrangement permits angularly adjusting the shaft 70 relative to the follower and, as a consequence, provides for initially positioning the grooving tool relative to the work.

The follower is journaled in a bearing 74 formed on the machine frame and is provided with spiraled cam grooves 75 at diametrically opposite sides for engagement with the rollers 76 journaled in a collar 77 for rotation about axes extending radially with respect to the axis of the follower. The collar 77 is detachably secured to the rear face of the bearing 74 so as to permit the same to be readily removed when it is desired to interchange the follower for one having cam grooves of different inclination. As in the first described form of the invention reciprocation of the follower 71 by the shaft 70 imparts a rotative movement to the shaft 70 and causes the grooving tool carried by the latter shaft to move throughout a path of travel corresponding in configuration to the cam grooves 75. In other words, the cam grooves 75 control the configuration of the oil grooves formed in the bushings and, consequently, the latter may be varied by changing the angle of inclination of the cam grooves. As previously stated, this may be readily accomplished in the present instance by merely removing the follower 71 and interchanging the same for another follower having cam grooves of the desired configuration. It will, of course, be understood that when the followers 75 are employed for rotating the grooving tool assemblies at the two stations, the angle of inclination of the cam grooves with respect to the axis of the follower at station A may be different from the one employed at station B, depending upon the particular configuration of oil groove it is desired to form in the bushings. In the event the cam grooves 75 in the follower 71 at station A are inclined directly opposite to the cam grooves in the follower at station B, a bushing having an oil groove of the type shown in Figure 10 will be formed, wherein the reference character 80 indicates the groove formed by the grooving assembly illustrated, and wherein the character 81 designates the groove formed by the other grooving assembly.

Any particular mechanism may be employed for indexing the turret C to successively position the bushing blanks in registration with the grooving tool assemblies at the two stations and, consequently, it is not believed necessary to complicate this description with a detailed definition of the indexing means, particularly when considering that this means may be identical in principle to the one shown in our above identified copending application. It will, of course, be further understood that although we have briefly defined the means for radially feeding the grooving tool as being the same as that shown in our copending application previously referred to, any suitable mechanism capable of accomplishing the feeding function may be successfully employed, without departing from the spirit and scope of this invention and reservation is made to make such changes in the details of construction that may come within the purview of the accompanying claims.

What we claim as our invention is:

1. In a metal working machine having work performing stations spaced from each other, means for successively positioning a bushing blank in operative relation to each of the stations, a grooving tool assembly at each station comprising a spindle carrying a tool insertable into the bushing blank as the latter is positioned in registration with each station, means for simultaneously reciprocating the spindles of both of the assemblies along their respective axes, and means rendered operative by reciprocation of the spindles to simultaneously rotate the latter in opposite directions about their axes.

2. In a metal working machine, a plurality of tool assemblies spaced from each other and each assembly having a spindle carrying a tool, means for successively positioning a work piece in operative relation to each of the tools, means for simultaneously reciprocating the spindles along their respective axes, and means rendered operative by reciprocation of the spindles to simultaneously rotate the latter in opposite directions.

3. In a machine for forming grooves in the inner surfaces of bushings, a plurality of tool assemblies spaced from each other and each assembly having a spindle carrying a tool, means for successively positioning a bushing in operative relation to each of the tools, means for reciprocating the spindles along their respective axes, means for feeding the tools radially outwardly toward the surface of the bushing to be grooved, and means rendered operative by reciprocation of the spindles to simultaneously rotate the spindles throughout paths of travel predetermined to provide grooves in the surfaces of the bushing on opposite sides of the axis of the latter.

4. In a machine for forming grooves in the inner surfaces of bushings, a plurality of tool assemblies spaced from each other and each assembly having a spindle carrying a tool, means for successively positioning a bushing in operative relation to each of the tools, means for reciprocating the spindles along their respective axes, and means rendered operative by reciprocation of the spindles to simultaneously rotate the spindles throughout paths of travel predetermined to provide grooves in the surfaces of the bushing on opposite sides of the axis of the latter.

5. In a machine of the class described, a shaft mounted for rotary and longitudinal movement, means for reciprocating said shaft, relatively stationary means having an inclined portion operable when said shaft is reciprocated for imparting a rotative movement to said shaft, a member mounted for radial sliding movement over an end of said shaft, a tool holder mounted on said member, a groove-forming tool carried by said holder, and means operable in timed relation to the means aforesaid for actuating the tool holder, including means within the shaft and operatively connected to said member, the configuration of the groove formed by the tool depending upon the particular inclination of the inclined portion aforesaid with respect to the axis of rotation of said shaft.

6. In a machine of the class described, spaced work performing stations, means for successively positioning work in operative relation to said stations, a grooving tool assembly at each station, each assembly including a work grooving tool, a common means for reciprocating simultaneously the work grooving tools at said stations, and relatively stationary means having inclined portions operable when said tools are reciprocated to impart a rotative movement to the grooving tools at said stations, the configuration of the grooves formed by the tools depending upon the particular inclination of the inclined portions aforesaid relative to the axes of rotation of said tools.

7. In a machine of the class described, a tool assembly having a spindle, and a groove-forming tool carried by said spindle, means for reciprocating the spindle along its axis, relatively stationary inclined means rendered operative by the reception of the spindle to impart a rotative movement to the spindle during reciprocation thereof, and means operable during movement of the spindle for feeding the tool radially with respect to the axis of the spindle toward the work to be grooved, the configuration of the grooves formed by the tool depending upon the particular inclination of the inclined means aforesaid relative to the axis of rotation of said spindle.

8. In a machine of the class described, a plurality of tool assemblies spaced from each other, each assembly having a spindle and a groove-forming tool carried by said spindle, means for successively positioning work in operative relation to each of said tools, means for reciprocating simultaneously the spindles along their respective axes, and inclined means rendered operative by reciprocation of the spindles to rotate said spindles, the configuration of the grooves formed by the tools depending upon the particular inclination of the inclined means aforesaid with respect to the axes of rotation of said spindles.

9. In a machine of the class described, a shaft mounted for rotary and longitudinal movement, means for reciprocating said shaft, means operable when said shaft is reciprocated for imparting a rotative movement to said shaft, a member mounted for radial sliding movement over an end of said shaft a tool holder mounted on said member, a groove-forming tool carried by the holder, and means operable in timed relation to the means aforesaid for actuating the tool holder including means operatively connected to said member.

10. In a machine of the class described, spaced work performing stations, means for successively positioning work in operative relation to said stations, a grooving tool assembly at each station, each assembly including a groove-forming tool, a crankshaft, means operable by said crankshaft for reciprocating simultaneously the work grooving tools at said stations, and means operable when said tools are reciprocated to impart rotative movement to the grooving tools at said stations.

GEORGE F. YAGER.
OLIVER J. HEATH.